(12) United States Patent
Qi et al.

(10) Patent No.: US 7,800,632 B2
(45) Date of Patent: *Sep. 21, 2010

(54) TRIANGLE RENDERING USING DIRECT EVALUATION

(75) Inventors: Yingyong Qi, San Diego, CA (US); Yushi Tian, San Diego, CA (US); Ning Bi, San Diego, CA (US)

(73) Assignee: Qualcomm Incorporated, San Diego ( * ) Notice: Subject to any disclaimer, the term of this patent is extended or adjusted under 35 U.S.C. 154(b) by 0 days.

This patent is subject to a terminal disclaimer.

(21) Appl. No.: 11/472,965

(22) Filed: Jun. 21, 2006

(65) Prior Publication Data

US 2006/0250410 A1 Nov. 9, 2006

Related U.S. Application Data

(62) Division of application No. 10/617,455, filed on Jul. 10, 2003.

(60) Provisional application No. 60/455,923, filed on Mar. 18, 2003.

(51) Int. Cl.
G06T 11/40 (2006.01)
G09G 5/00 (2006.01)

(52) U.S. Cl. ...................... 345/622; 345/441

(58) Field of Classification Search ................ 345/441, 345/581, 621, 622
See application file for complete search history.

(56) References Cited

U.S. PATENT DOCUMENTS

| | | | | |
|---|---|---|---|---|
| 4,646,076 | A | * | 2/1987 | Wiedenman et al. ........ 345/441 |
| 4,897,805 | A | * | 1/1990 | Wang .......................... 345/441 |
| 5,598,517 | A | * | 1/1997 | Watkins ...................... 345/441 |
| 5,914,722 | A | * | 6/1999 | Aleksic ....................... 345/423 |
| 6,288,724 | B1 | | 9/2001 | Kumar |
| 6,407,736 | B1 | | 6/2002 | Regan |
| 6,549,210 | B1 | | 4/2003 | Van Hook et al. |

(Continued)

FOREIGN PATENT DOCUMENTS

EP 0733997 9/1996

(Continued)

OTHER PUBLICATIONS

Triangle Rendering Algorithm, Jun. 1, 1992, IBM Technical Disclosure Bulletin, US, Vol. No. 35, Issue No. 1B, pp. 151-157.*

(Continued)

*Primary Examiner*—Jeffery A Brier
(74) *Attorney, Agent, or Firm*—George C. Pappas; James Gambale, Jr.

(57) ABSTRACT

This disclosure describes an apparatus, such as a wireless communication device, that applies a direct evaluation technique to render triangles for the 3D graphical environment. The apparatus includes a rendering engine that defines a rectangular area of pixels, referred to as a bounding box, that bounds the area to be rendered. The rendering engine evaluates coordinates associated with the pixels of the rectangular area to selectively render those pixels that fall within the triangular area. The direct evaluation triangle rendering algorithm may require fewer complex operations than the more computationally intensive interpolation process employed by other systems. As a result, the apparatus may present a 3D graphical environment while preserving as much as possible the available power.

12 Claims, 4 Drawing Sheets

U.S. PATENT DOCUMENTS

| | | | |
|---|---|---|---|
| 6,624,823 B2 | 9/2003 | Deering | |
| 6,693,637 B2* | 2/2004 | Koneru et al. | 345/501 |
| 6,795,080 B2 | 9/2004 | Lavelle et al. | |
| 7,126,600 B1 | 10/2006 | Fowler et al. | |
| 7,143,098 B2 | 11/2006 | Chen et al. | |
| 7,474,308 B2 | 1/2009 | Deering | |
| 7,489,317 B2 | 2/2009 | Tuomi et al. | |
| 2004/0164985 A1* | 8/2004 | Kato et al. | 345/441 |

FOREIGN PATENT DOCUMENTS

| | | |
|---|---|---|
| JP | 06004679 | 1/1994 |
| JP | 7141519 | 6/1995 |
| JP | 08022548 | 1/1996 |
| JP | 2002529808 | 9/2002 |
| WO | 0028480 | 5/2000 |
| WO | 0120553 | 3/2001 |
| WO | 0180183 | 10/2001 |

OTHER PUBLICATIONS

Juan Pineda, "A Parallel Algorithm for Polygon Rasterization" published in Computer Graphics, ACM, vol. 22, No. 4, Aug. 1988, pp. 17-20.*

Deering, Schlapp and Lavelle, "FBRAM: A New Form of Memory Optimized for 3D Graphics" published at Siggraph 94, ACM, pp. 1-8.*

ECE 595 / CS 491 / CS591 Real-time Rendering and Graphics Hardware, Spring 2007 course project from The University of New Mexico.*

John Poulton, Henry Fuchs, John Austin, John Eyles, Justin Heinecke, Cheng-Hong Hsieh, Jack Goldfeather, Jeff Hultquist, and Susan Spach; Pixel-Planes: Building a VLSI-Based Graphic System; 1985; Proceedings of the 1985 Chapel Hill Conference on VLSI, Rockville, MD, Computer Science Press, pp. 35-60.*

John Eyles, John Austin, Henry Fuchs, Trey Greer, John Poulton; Pixel-Planes 4: A Summary; Advances in Computer Graphics Hardware II; 1988; Eurographics Seminars, pp. 183-207.*

Henry Fuchs, John Poulton, John Eyles, Trey Greer, Jack Goldfeather, David Ellsworth, Steve Molnar, Greg Turk, Brice Tebbs, Laura Israel; Pixel-Planes 5: A Heterogeneous Multiprocessor Graphics System Using Processor-Enhanced Memories; Jul. 1989; ACM SIGGRAPH Computer Graphics; vol. 23, Issue 3; pp. 79-88.*

International Search Report—PCT/US074/008285—ISA/EPO—Jul. 15, 2004.

Written Opinion—PCT/US074/008285—ISA/EPO—Jul. 15, 2004.

International Preliminary Examination Report—PCT/US04/008285—IPEA/US—Feb. 2, 2006.

Foley et al.,"Computer Graphics", New York: Addison-Wesley, 1997. pp. 894-898.

* cited by examiner

TRIANGLE RENDERING USING DIRECT EVALUATION

CROSS REFERENCE TO RELATED APPLICATIONS

This application claims priority from U.S. Provisional Application Ser. No. 60/455,923, filed Mar. 18, 2003, and is a divisional of U.S. patent application Ser. No. 10/617,455, filed Jul. 10, 2003, entitled "TRIANGLE RENDERING USING DIRECT EVALUATION," the entire content of which is incorporated herein by reference.

TECHNICAL FIELD

The invention relates to mobile computing devices and, in particular, to techniques for rendering graphics for display by the mobile computing devices.

BACKGROUND

Mobile computing devices, such as personal digital assistants (PDAs), wireless communication devices, global positioning devices, and the like, are increasingly requiring advanced two-dimensional (2D) and three-dimensional (3D) graphics applications. For example, the mobile computing devices increasingly offer games, character animations, graphical menu systems, and other applications that require advanced graphics rendering. This advanced graphics rendering, especially with 3D graphics, involves a substantial amount of data processing. Furthermore, these processing requirements only increase as the mobile computing devices adopt display panels that offer increased resolution and color depth.

One fundamental operation of a 3D graphics application is triangular rendering. In particular, a 3D graphical object is typically defined by a set of triangles in a 3D space. Each triangle is defined by three vertices within the 3D space and associated attributes of each vertex, including color attributes, texture coordinates, or both. Each triangle is graphically rendered using an interpolation process that fills the interior of the triangle based on the location and attribute information defined at the three vertices. More specifically, each starting and ending coordinate is computed for each line of pixels within the triangle using the interpolation process. The pixels along each line are sequentially filled to render the entire triangle.

One challenge for mobile computing devices, however, is the typical limitation of available power. Unlike a desktop computing environment, mobile computing devices typically have limited battery power. As a result, the computationally intensive interpolation process required for triangular rendering may place a significant strain on the available power of the mobile computing device.

SUMMARY

The disclosure is directed to techniques for rendering a triangular area of pixels for presentation on a display device. The techniques may be particularly useful in a mobile computing environment presenting limited power resources.

In one embodiment, a method comprises computing data that defines a rectangular area of pixels that bounds a triangular area of the pixels, and evaluating coordinates of the pixels of the rectangular area to determine which pixels fall within the triangle area. The method further comprises updating pixel data for the pixels that fall within the triangle area to render the triangular area.

In another embodiment, an apparatus comprises a rendering engine that defines a rectangular area of pixels that bounds a triangular area of the pixels. The rendering engine evaluates coordinates associated with the pixels of the rectangular area to selectively render the pixels that fall within the triangular area.

In another embodiment, a mobile communication device comprises a display, a processor, and a rendering engine. The processor generates video output data for presentation by the display as a graphical environment. The rendering engine applies a direct evaluation algorithm to render a triangle for the graphical environment, wherein the direct evaluation algorithm applies linear equations to render the triangle without interpolating between edges of the triangle.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
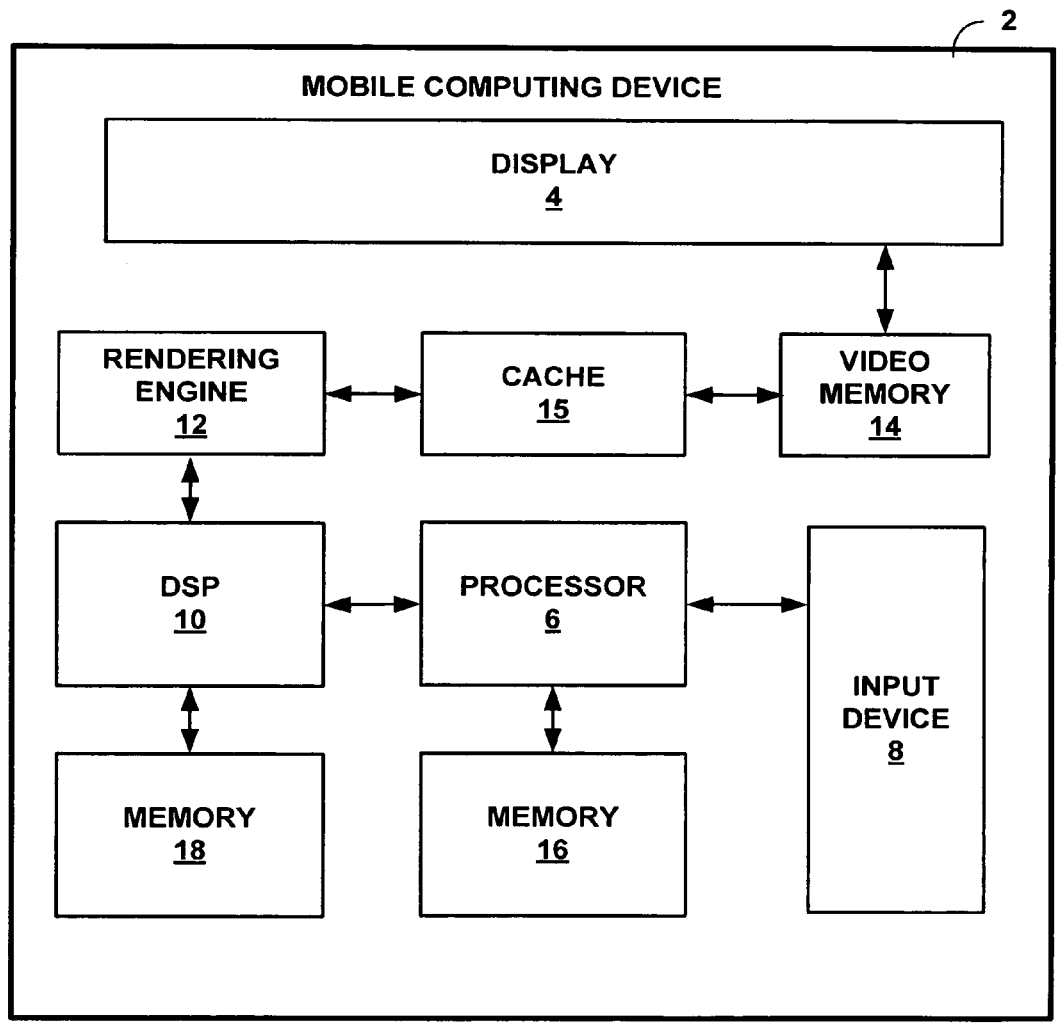
FIG. 1 is a block diagram illustrating an example embodiment of a mobile computing device.

FIG. 1 is a block diagram illustrating an example mobile computing device 2 that presents a three-dimensional (3D) graphical environment on display 4. Mobile computing device 2 may be, for example, a personal digital assistant (PDA), a wireless communication device such as a mobile phone or satellite phone, a global positioning device, a portable digital television, a digital video camera, a wireless video device, a device integrating any of the foregoing devices, and the like. Examples of the 3D graphical environment presented by mobile computing device 2 include games, character animations, graphical menu systems, and other applications that require advanced graphics rendering.

Processor 6 provides primary control over the components of mobile computing device 2. For example, processor 6 captures input from a user via input device 8, such as a keypad, and directs digital signal processor (DSP) 10 to generate video output data for presenting the 3D graphical environment on display 4. Display 4 may comprise any output device, e.g., a liquid crystal display (LCD) for a camcorder or a mobile phone screen. In particular, DSP 10 issues commands to rendering engine 12 to direct the rendering engine to render graphical objects, e.g., triangles, within a 3D space. Based on the commands, rendering engine 12 processes video data stored within video memory 14 and cache 15 for driving display 4.

Processor 6 may take the form of an embedded microprocessor, specialized hardware, software, e.g., a control software module, or combinations thereof. Moreover, DSP 10, processor 6, rendering engine 12, as well as other components of mobile computing device 2, may be implemented in one or more application-specific integrated circuits (ASICs), as multiple discrete components, or combinations thereof.

Memories 16 and 18 store instructions and data for use by processor 6 and DSP 10, respectively. Although illustrated separately, memories 16 and 18 may comprise one or more memory devices. Moreover, memories 16 and 18 may comprise read-only memory (ROM), synchronous dynamic random access memory (SDRAM), non-volatile static random access memory (SRAM), Flash memory, electrically erasable programmable read-only memory (EEPROM), and the like.

As described herein, DSP 10 and a rendering engine 12 interact to apply a direct evaluation technique to render triangles for the 3D graphical environment. More specifically, DSP 10 issues commands to rendering engine 12 to direct the rendering engine to render triangles within a 3D space. In response, rendering engine 12 applies a direct evaluation triangle rendering algorithm that requires fewer division operations than the more computationally intensive interpolation process employed by conventional systems. As a result, mobile computing device 2 may present a 3D graphical environment while preserving as much as possible the power available to the mobile computing device.

To invoke rendering engine 12, DSP 10 issues a command that specifies the three vertices of the triangle to be rendered. For example, as illustrated in the example triangle depicted by FIG. 2, DSP 10 issues a command that defines triangle 20 with a first vertex $(X_0, Y_0)$, a second vertex $(X_1, Y_1)$, and a third vertex $(X_2, Y_2)$, where each of the vertices represents a coordinate within a 2D slice of a 3D environment. Consequently, the vertices define a triangle having edges 24A, 24B and 24C.

Figure 2:
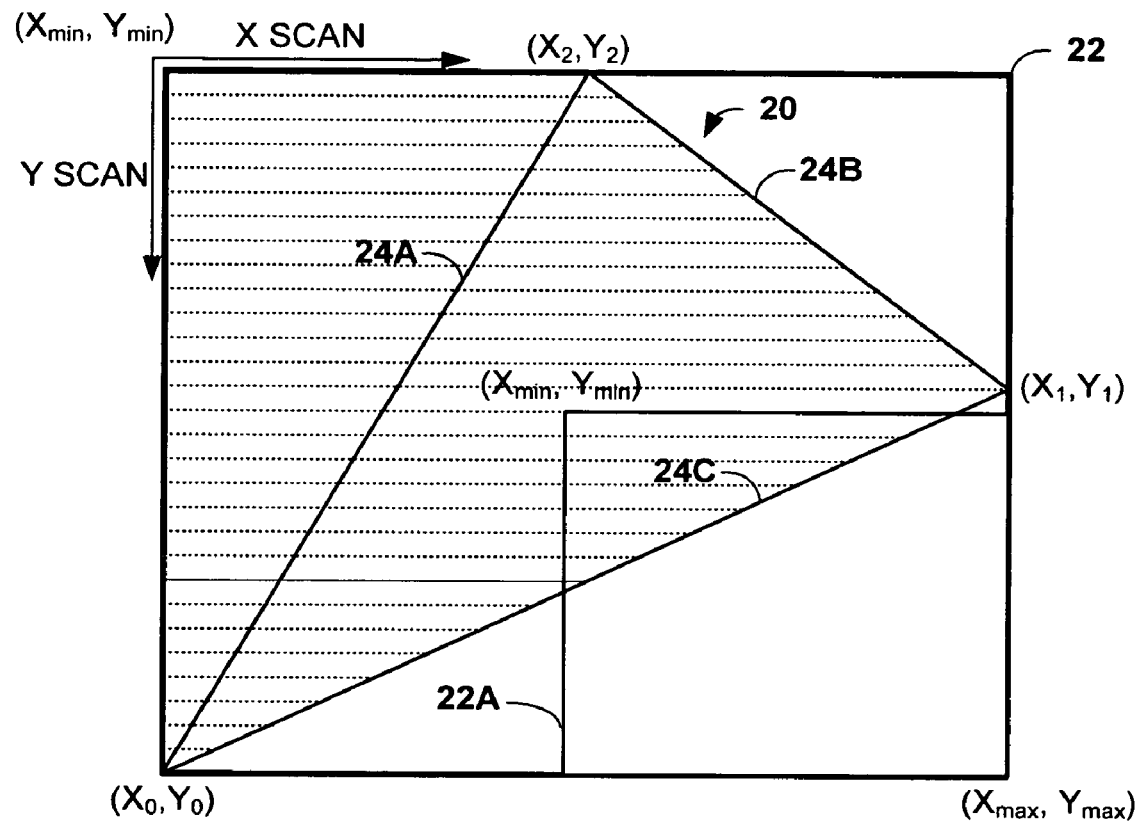
FIG. 2 is a graph that illustrates application of direct evaluation triangle rendering techniques.

In response to the command, rendering engine 12 computes a "bounding box" 22, which refers to a rectangular area defined to bound a minimum and a maximum of the x,y coordinates of the triangle. Bounding box 22, for example, is defined by an upper-left coordinate $(X_{min}, Y_{min})$ and a lower-right coordinate $(X_{max}, Y_{max})$. As illustrated in the example of FIG. 2, bounding box 22 may be defined to cover a minimum area within the 2D slice to encompass triangle 20. In other embodiments, minimum dimensions for bounding box 22 may be computed as function of a block size of video blocks stored by cache 15. In particular, DSP 10 and rendering engine 12 may process output video data of video memory 14 in a "tiled" fashion, i.e., in block fashion along rows and columns. Moreover, the block size may be set based on the capacity of cache 15. For example, the block size may equal the capacity of the cache. In this manner, the dimensions of bounding box 22 may be defined to be equal to or less than the dimensions of a video block in the event a triangle to be rendered lies completely within a single video block. For triangles spanning more than one video block, a bounding box may be used that has dimensions calculated to encompass the overlap between the bounding box of the triangle and the video block, as illustrated by bounding box 22A. This may advantageously reduce the number of memory accesses required for retrieving and rendering pixel data associated with the triangle, which translates into power savings.

After calculating the bounding box, e.g., bounding box 22 of FIG. 2, rendering engine 12 processes each pixel line encompassed by the bounding box and selectively enables those pixels that fall within triangle 20. Specifically, rendering engine 12 scans the pixels lines, e.g., in a rightward and downward fashion, and applies linear equations to determine whether each pixel falls within triangle 20. For those pixels within the edges 24A, 24B and 24C, rendering engine 12 updates the current attributes for the pixels, e.g., based on z-value, color information, texture information, or the like, associated with triangle 20.

Figure 3:
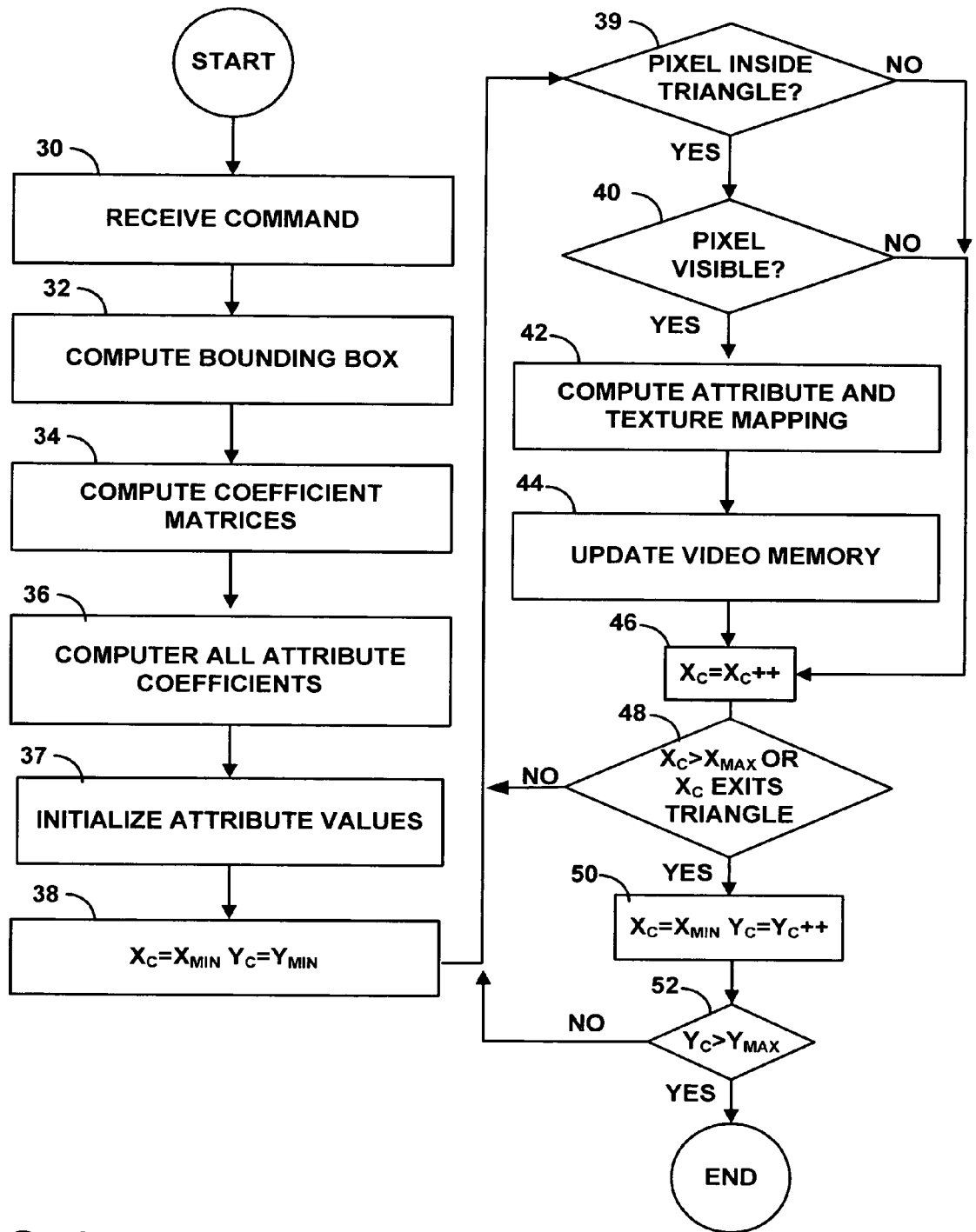
FIG. 3 is a flowchart illustrating example operation of a rendering engine in application of the direct evaluation techniques.

FIG. 3 is a flowchart illustrating example operation of rendering engine 12 in application of a direct evaluation algorithm for rendering a triangle. Initially, rendering engine 12 receives a command from DSP 10 that specifies three vertices of a triangle to be rendered, i.e., a first vertex $(X_0, Y_0)$, a second vertex $(X_1, Y_1)$, and a third vertex $(X_2, Y_2)$ (step 30 of FIG. 3).

In response to the command, rendering engine 12 computes data, e.g., an upper left coordinate and a height and width, that defines the bounding box that encompasses the triangle defined by the vertices (step 32).

In addition, rendering engine 12 computes a coefficient matrix $M^{-1}$ for computing the linear coefficients of the linear equations that describe the attributes of each pixel within the triangle, and a coefficient matrix $M_C$ for computing the linear coefficients of the linear equations that describe the three edges of the triangle (step 34). Specifically, an attribute value v for a pixel located inside the triangle can be represented as a linear function of the x,y location in the screen space as follows:

$$v = Ax + By + C. \quad (1)$$

Consequently, the linear coefficients, A, B, and C for eq. (1) can be obtained from the three equations associated with the three vertices:

$$v_0 = Ax_o + By_o + C \quad (2)$$
$$v_1 = Ax_1 + By_2 + C$$
$$v_2 = Ax_2 + By_2 + C$$

where $v_i$ (i=0, 1, 2), is the attribute value defined at vertex i, and $(x_i, y_i)$(i=0, 1, 2) are the screen coordinates of vertex i. Using matrix notations, the vertices can be represented as:

$$\begin{bmatrix} v_o \\ v_1 \\ v_2 \end{bmatrix} = \begin{bmatrix} x_0 & y_0 & 1 \\ x_1 & y_1 & 1 \\ x_2 & y_2 & 1 \end{bmatrix} = \begin{bmatrix} A \\ B \\ C \end{bmatrix}. \quad (3)$$

Thus, the coefficients for attribute interpolation can be expressed as:

$$\begin{bmatrix} A \\ B \\ C \end{bmatrix} = M^{-1} \begin{bmatrix} v_o \\ v_1 \\ v_2 \end{bmatrix}. \quad (4)$$

where $$M = \begin{bmatrix} x_0 & y_0 & 1 \\ x_1 & y_1 & 1 \\ x_2 & y_2 & 1 \end{bmatrix} \quad (5)$$

The coefficient matrix $M^{-1}$/for computing the coefficients for attribute interpolation can be computed using Laplace expansion as follows $$M^{-1} = \frac{1}{\det(M)} M_C^T \qquad (6)$$

where $$\det(M) = |M| = x_1 y_2 + x_2 y_0 + x_0 y_1 - x_2 y_1 - x_0 y_2 - x_1 y_0 \qquad (7)$$

$M_c$, the companion matrix of M, can be calculated as:

$$M_c = \begin{bmatrix} y_1 - y_2 & x_2 - x_1 & x_1 y_2 - x_2 y_1 \\ y_2 - y_0 & x_0 - x_2 & x_2 y_0 - x_0 y_2 \\ y_0 - y_1 & x_1 - x_0 & x_0 y_1 - x_1 y_0 \end{bmatrix}. \qquad (8)$$

Upon calculating the coefficient matrices $M^{-1}$ and $M_C$, rendering engine 12 computes coefficients A, B, C, for all attributes associated with the pixels (step 36). In particular, the coefficient matrix $M^{-1}$ can be used for computing the coefficients of different attributes, although the values at the vertices, $(v_0, v_1, v_2)$, are different for different attributes.

Next, rendering engine 12 initializes all attribute values at a starting pixel of the bounding box, e.g., $(X_{min}, Y_{min})$ of FIG. 2, (step 37). In addition, rendering engine 12 initializes current pixel index values $(X_C, Y_C)$ to a first pixel of a first scan line of the bounding box, i.e., $X_{MIN}$ and $Y_{MIN}$ (step 38).

During the direct evaluation rasterization process, rendering engine 12 tests the current pixel $(X_C, Y_C)$ to determine whether the pixel falls within the triangle (step 39). Specifically, rendering engine 12 applies the previously calculated matrix $M_C$ based on a set of edge equations delineating the triangle to determine whether the location of the current pixel falls within the triangle. These equations are uniquely defined by the coordinates of the three vertices. In particular, for a given starting vertex $(x_i, y_i)$, and ending point $(x_j, y_j)$, on a 2D plane, for example, the edge equation is, $$\frac{y - y_i}{x - x_i} = \frac{y_j - y_i}{x_j - x_i} \text{ or,} \qquad (9)$$

$$(y_i - y_j)x + (x_j - x_i)y + x_i y_j - x_j y = 0. \qquad (10)$$

For the three edges with starting vertex index, i=1, 2, 0, and ending vertex index, j=2, 0, 1, three edge equations in matrix format can be expressed as:

$$\begin{bmatrix} e_1 \\ e_2 \\ e_3 \end{bmatrix} = M_C \begin{bmatrix} X_C \\ Y_C \\ 1 \end{bmatrix} = \begin{bmatrix} 0 \\ 0 \\ 0 \end{bmatrix}. \qquad (11)$$

Thus, rendering engine 12 applies the matrix $M_C$ to the current pixel $(X_C, Y_C)$, and determines that the pixel is inside the triangle when all of $e_1$, $e_2$, $e_3$ are less than zero.

If the pixel is not within the triangle (no branch of 39), rendering engine 12 proceeds to the next pixel along the scan line of the bounding box, i.e., increments $X_C$ (step 46) and, assuming the end of the scan line has not been reached (step 48), tests that pixel in accordance with equation (11) to determine whether the pixel is within the triangle (step 39).

If application of equation (11) indicates that the current pixel is within the triangle, rendering engine 12 determines whether the current pixel is visible (step 40). Specifically, rendering engine 12 determines the position of the current pixel along the z-axis to determine whether the pixels is visible, or whether pixels from other slices of the 3D graphic environment prevent the pixel from being visible to the user, i.e., are on top of the current pixel. In one embodiment, rendering engine 12 compares a z-value, $z_c$, of the current pixel with the corresponding z-value, $z_b$, of a z-buffer to determine if the pixel is visible, i.e., if $z_c < z_b$.

If the pixel is not visible (no branch of step 40), rendering engine 12 proceeds to the next pixel (step 46). If, however, the pixel is visible, rendering engine 12 computes attribute values, e.g., texture and color values, for the pixel based on equation (1) (step 42). Upon computing the attribute values, rendering engine 12 updates the value of the current pixel within video memory 14 based on the computed attributes (step 44).

After updating the value of the current pixel within video memory 14, rendering engine 12 proceeds to the next pixel (step 46). This process is repeated until the end of the current scan line is reached, i.e., $X_C > X_{MAX}$ or the current pixel exits the triangle (step 48), causing rendering engine 12 to proceed to the beginning of the next scan line, i.e., set $X_C = X_{MIN}$ and incrementing $Y_C$ (step 50). Rendering engine 12 traverses each scan line of the bounding box testing each pixel in this manner, and terminates the rendering process when the last scan line has been completed, i.e., $Y_C > Y_{MAX}$ (step 52).

Figure 4:
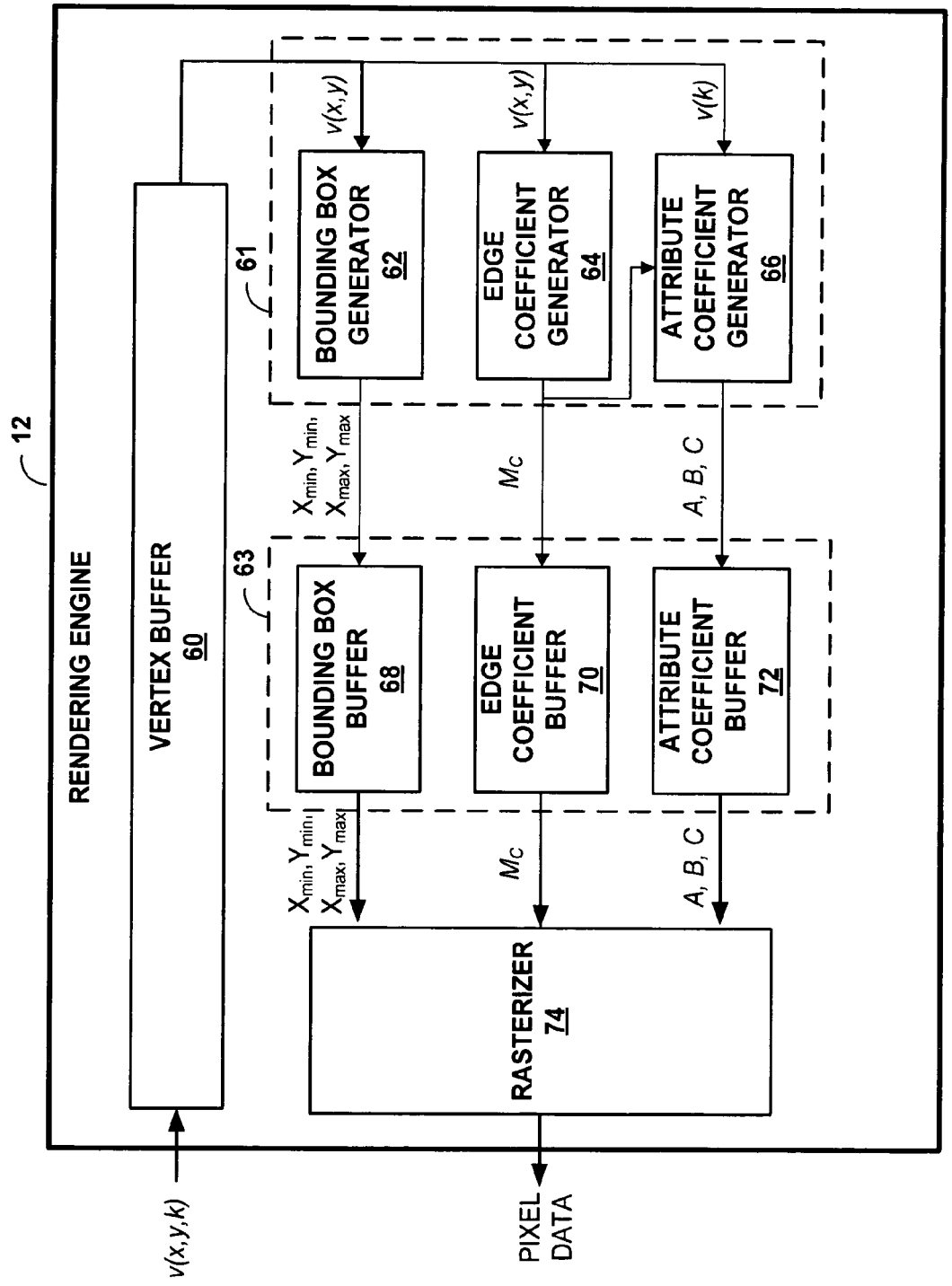
FIG. 4 is a block diagram illustrating an example embodiment of the rendering engine of FIG. 3.

FIG. 4 is a block diagram illustrating an example embodiment of rendering engine 12. In the illustrated embodiment, rendering engine 12 includes a vertex buffer 60 for buffering vertices for triangles to be rendered in accordance with the direct evaluation techniques. In particular, rendering engine 12 receives commands from DSP 10 that specify triangles in the form of three vertices. Each vertex is defined by at least an x and y coordinate, and may include one or more attribute values k, such as z-values, color values, texture values, and the like.

Rendering engine 12 queues the vertex information in vertex buffer 60 for processing by processing engine 61, which includes bounding box generator 62, edge coefficient generator 64, and attribute coefficient generator 66. Bounding box generator 62 computes and outputs data values that define the dimensions of the bounding box associated with the triangle to be rendered. For example, bounding box generator 62 may output an upper-left coordinate $(X_{min}, Y_{min})$ and a lower-right coordinate $(X_{max}, Y_{max})$ for the bounding box.

Edge coefficient generator 64 processes the vertex coordinate information to generate the linear edge coefficients matrix $M_c$, as described above. Similarly, attribute coefficient generator 66 processes the vertex coordinate information to generate the linear attribute coefficients A, B, C as described above.

Rendering engine 12 further includes rasterizer 74 that processes the parameters produced by processing engine 61, and applies the direct evaluation techniques to produce pixel data to drive video memory 14 and display 4. Output buffer 63 includes bounding box buffer 68, edge coefficient buffer 70, and attribute coefficient buffer 72 to queue parameters defining the bounding box, linear edge coefficients, and linear attribute coefficients associated with each triangle to be rendered by rasterizer 74.

Various embodiments of the invention have been described. These and other embodiments are within the scope of the following claims.

The invention claimed is:

1. A method comprising:
defining in a rendering engine a rectangular area of pixels that bounds an entire triangular area of the pixels that defines a triangle to be rendered, wherein the rendering engine is implemented as one or more application-specific integrated circuits (ASICs);
selecting in the rendering engine a line of pixels within the rectangular area of pixels;
sequentially evaluating in the rendering engine coordinates associated with the pixels of the line of pixels starting at one end of the rectangular area to determine whether the pixels fall within the triangular area, wherein the one end of the rectangular area is common for the sequential evaluation of each line of pixels;
ceasing in the rendering engine evaluation of the coordinates associated with the pixels of the line of pixels upon determining that at least one pixel of the line falls within the triangular area and a current pixel no longer falls within the triangular area; and
updating in the rendering engine pixel data for the pixels that fall within the triangular area to render the triangular area, wherein updating pixel data comprises computing pixel data for the pixels of the rectangular area that fall within the triangular area in accordance with a set of linear equations that describe one or more attributes associated with the triangular area, computing an inverse coefficient matrix $M^{-1}$ for computing linear coefficients of the set of linear equations, and applying the linear coefficients to each of the pixels that falls within the triangular area to compute an attribute value for each of the pixels, wherein applying the inverse coefficient matrix $M^{-1}$ comprises applying the inverse coefficient matrix $M^{-1}$ to compute the linear coefficients A, B, and C, for an attribute associated with vertices $v_0(x_0,y_0)$, $v_1(x_1,y_1)$, and $v_2(x_2,y_2)$ of the triangle as:

$$\begin{bmatrix} A \\ B \\ C \end{bmatrix} = M^{-1} \begin{bmatrix} v_o \\ v_1 \\ v_2 \end{bmatrix},$$

where a coefficient matrix M equals:

$$M = \begin{bmatrix} x_0 & y_0 & 1 \\ x_1 & y_1 & 1 \\ x_2 & y_2 & 1 \end{bmatrix},$$

where the inverse coefficient matrix $M^{-1}$ equals:

$$M^{-1} = \frac{1}{\det(M)} M_C^T,$$

where det(M) equals:

$$\det(M) = |M| = x_1 y_2 + x_2 y_0 + x_0 y_1 - x_2 y_1 - x_0 y_2 - x_1 y_0,$$

where $M_C^T$ is a transpose of matrix $M_C$,
where matrix $M_c$ equals:

$$M_c = \begin{bmatrix} y_1 - y_2 & x_2 - x_1 & x_1 y_2 - x_2 y_1 \\ y_2 - y_0 & x_0 - x_2 & x_2 y_0 - x_0 y_2 \\ y_0 - y_1 & x_1 - x_0 & x_0 y_1 - x_1 y_0 \end{bmatrix} \text{ and}$$

an attribute value for each pixel $(X_c, Y_c)$ is computed as $$v = AX_c + BY_c + C.$$

2. The method of claim 1, wherein evaluating coordinates comprises evaluating the coordinates of the pixels in accordance with a set of linear equations for computing edges of the triangular area.

3. The method of claim 2, wherein evaluating the coordinates of the pixels comprises:
computing the coefficient matrix $M_C$ for computing linear coefficients for the set of linear equations; and
applying the coefficient matrix $M_C$ to one or more pixels within the rectangular area to determine whether each of the pixels falls within the triangular area.

4. The method of claim 3, wherein applying the coefficient matrix $M_C$ to one or more pixels comprises applying the coefficient matrix $M_C$ to a current one of the one or more pixels $(X_C, Y_C)$ within the rectangular area, wherein the current one of the one or more pixels is determined to be within the triangular area when $$M_C \begin{bmatrix} X_C \\ Y_C \\ 1 \end{bmatrix} \leq \begin{bmatrix} 0 \\ 0 \\ 0 \end{bmatrix}.$$

5. The method of claim 1, wherein the attribute values comprise at least one of color values and texture values.

6. The method of claim 1, further comprising:
determining whether each of the pixels within the rectangular area is visible; and
selectively rendering each of the pixels based on the determination.

7. The method of claim 6, wherein determining whether each of the pixels is visible comprises comparing a z-value, $z_c$, of the pixels with a corresponding z-value, $z_b$, of a z-buffer to determine if $z_c < z_b$.

8. The method of claim 1, wherein defining a rectangular area comprises computing a first coordinate and a second coordinate that represent opposite corners of the rectangular area.

9. The method of claim 1, wherein
updating pixel data comprises processing the pixel data within a cache memory having a block size; and
defining a rectangular area comprises defining the rectangular area as a function of the block size of the cache memory.

10. The method of claim 1, wherein the selected line of pixels within the rectangular area of pixels comprises a current line of pixels, the method further comprising:
selecting a subsequent line of pixels that is subsequent to the current line of pixels within the rectangular area of pixels;
sequentially evaluating coordinates of pixels of the subsequent line of pixels starting at the one end of the rectangular area utilized to evaluate the current line of pixels to determine whether the pixels fall within the triangular area;

ceasing evaluation of the coordinates of the pixels of the subsequent line of pixels upon determining that at least one pixel of the subsequent line falls within the triangular area and a current pixel no longer falls within the triangular area; and updating pixel data for the pixels that fall within the triangular area to render the triangular area.

11. A method comprising:

defining in a rendering engine a rectangular area of pixels that bounds an entire triangular area of the pixels that defines a triangle to be rendered, wherein the rendering engine is implemented as one or more application-specific integrated circuits (ASICs);

computing in the rendering engine a coefficient matrix for computing a set of linear coefficients of a set of linear equations that describe edges of the triangular area;

applying in the rendering engine the coefficient matrix to one or more of the pixels within the rectangular area starting at one end of the rectangular area to determine whether the one or more pixels fall within the triangular area, wherein the one end of the rectangular area is common for the application of the coefficient matrix for each line of pixels;

ceasing in the rendering engine applying the coefficient matrix upon determining that at least one pixel of the line falls within the triangular area and a current pixel no longer falls within the triangular area; and updating in the rendering engine pixel data for the pixels that fall within the triangular area to render the triangular area, wherein updating pixel data comprises computing pixel data for the pixels of the rectangular area that fall within the triangular area in accordance with the set of linear equations that describe one or more attributes associated with the triangular area, computing an inverse coefficient matrix $M^{-1}$ for computing linear coefficients of the set of linear equations, and applying the linear coefficients to each of the pixels that falls within the triangular area to compute an attribute value for each of the pixels, wherein applying the inverse coefficient matrix $M^{-1}$ comprises applying the inverse coefficient matrix $M^{-1}$ to compute the linear coefficients A, B, and C, for an attribute associated with vertices $v_0(x_0,y_0)$, $v_1(x_1,y_1)$, and $v_2(x_2,y_2)$ of the triangle as:

$$\begin{bmatrix} A \\ B \\ C \end{bmatrix} = M^{-1} \begin{bmatrix} v_0 \\ v_1 \\ v_2 \end{bmatrix},$$

where a coefficient matrix M equals:

$$M = \begin{bmatrix} x_0 & y_0 & 1 \\ x_1 & y_1 & 1 \\ x_2 & y_2 & 1 \end{bmatrix},$$

where the inverse coefficient matrix $M^{-1}$ equals:

$$M^{-1} = \frac{1}{\det(M)} M_C^T,$$

where det(M) equals:

$$\det(M)=|M|=x_1y_2+x_2y_0+x_0y_1-x_2y_1-x_2y_1-x_1y_0,$$

where $M^T_C$ is a transpose of matrix $M_C$,
where matrix $M_C$ equals:

$$M_c = \begin{bmatrix} y_1 - y_2 & x_2 - x_1 & x_1y_2 - x_2y_1 \\ y_2 - y_0 & x_0 - x_2 & x_2y_0 - x_0y_2 \\ y_0 - y_1 & x_1 - x_0 & x_0y_1 - x_1y_0 \end{bmatrix}, \text{ and}$$

an attribute value for each pixel $(X_c, Y_c)$ is computed as $$v=AX_c+BY_c+C.$$

12. The method of claim 11, further comprising:

determining whether the pixels within the rectangular area are visible; and selectively rendering the pixels based on the determination.

* * * * *